United States Patent

[11] 3,633,891

| [72] | Inventors | Robert F. Heran<br>1842 Donna Drive, West Lake, Ohio 44145;<br>Calvin C. Blackman, 24272 West Lake Road, Bay Village, Ohio 44140 |
|---|---|---|
| [21] | Appl. No. | 35,216 |
| [22] | Filed | May 6, 1970 |
| [45] | Patented | Jan. 11, 1972 |

[54] METHOD AND APPARATUS FOR HEATING ANNULAR WORKPIECES
17 Claims, 6 Drawing Figs.

| [52] | U.S. Cl. | 263/42 TH, 263/4 |
|---|---|---|
| [51] | Int. Cl. | F27b 5/14, F27d 3/00 |
| [50] | Field of Search | 263/40, 42 TH, 2, 4, 5 |

[56] References Cited
UNITED STATES PATENTS

| 2,137,868 | 11/1938 | Wilson | 263/42 R |
|---|---|---|---|
| 2,309,699 | 2/1943 | Huff | 263/5 X |
| 1,445,220 | 2/1923 | Lee | 263/4 |
| 3,034,774 | 5/1962 | Broomhead et al. | 263/4 X |

Primary Examiner—John J. Camby
Attorney—William N. Hogg

ABSTRACT: A heating apparatus is provided which includes a base disposed to support motor stators in stacked relationship, and a radiantly heated tube disposed to extend upwardly through the centers of the stacked stators. An afterburner chamber is provided through which volatile combustible material is passed and wherein it is completely burned before it is passed to the atmosphere. The stators are heated radiantly around their inner periphery by means of the tube to condition the insulation on the wires to allow removal of the wires.

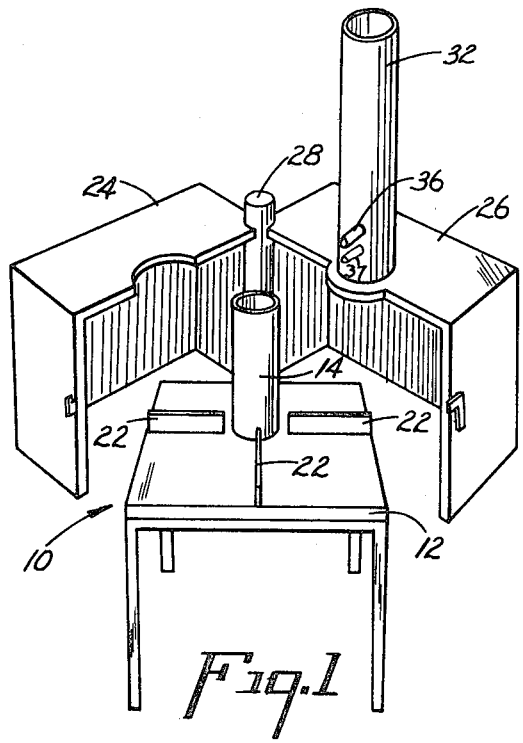
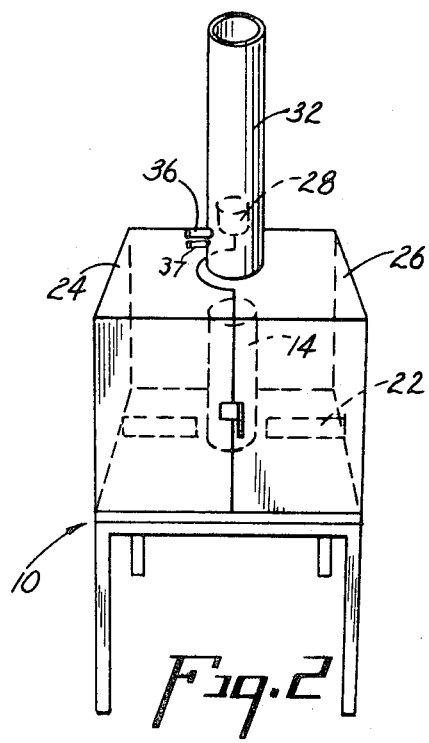
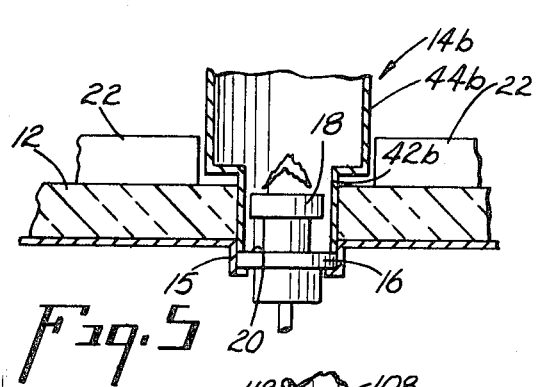
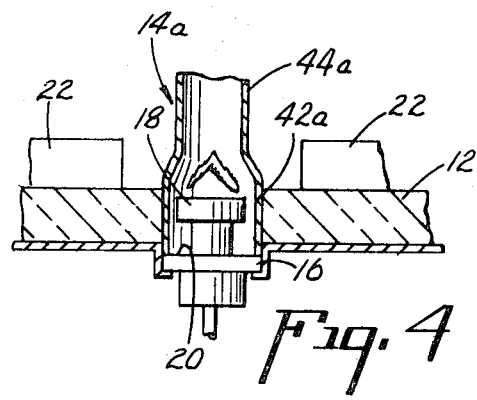
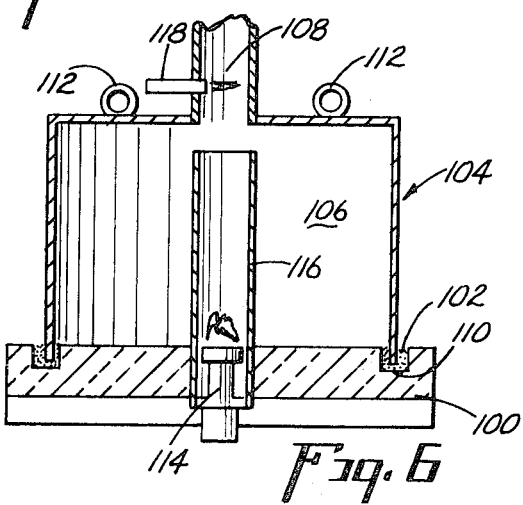
ROBERT F. HERAN
CALVIN C. BLACKMAN
INVENTORS
BY J. W. Douglas
ATTORNEY

METHOD AND APPARATUS FOR HEATING ANNULAR WORKPIECES

BACKGROUND OF INVENTION

This invention relates generally to heating furnaces and more particularly to heating furnaces adapted to heat motor stators to permit the windings thereon to be facilely removed.

In the motor rebuilding art, the stators of the motors which are to be rebuilt often have to be rewound. In order to rewind the stators, it is necessary first to remove the old windings. Conventionally, these windings are of insulated wire and are tightly packed into the slots provided therefor. Because of the tight winding in the slots, the wires cannot be readily removed. Therefore, in order to remove the wire, it has been conventional prior art practice to either burn off the insulation of the wires, for example, with a blowtorch or the like, or alternately to soften the insulation by chemical treatment. Either of these procedures is acceptable to treat the wires for facile removal. However, both of these procedures have serious limitations and drawbacks.

With respect to the procedure of burning off the insulation with a blowtorch, this is normally accomplished by placing the motor on some surface and then taking a blowtorch and manually heating around the inner circumference of the stator, causing the insulation of the wire to char. With such a procedure, the heating is very inefficient and is very uneven, which can result in warpage of the stators if the heat is excessive. Also, the insulation when being burned is not completely combusted which passes volatile combustible matter and volatile particles into the atmosphere which often results in a serious air pollution problem. Also, this method is relatively slow and inefficient.

In the technique of chemically treating wires, the motor stators are immersed in heated trichlorethylene and allowed to remain therein until the insulation on the wires is softened, after which the stators are removed and the softened insulation allows the wires to be facilely removed. This technique also has some serious limitations. First, a rather large amount of trichlorethylene is consumed in the process, thus resulting in a rather high material cost. Also, the insulation on the wires remains soft only while the stator is at elevated temperatures, and as the stators cool to ambient temperature the insulation returns to its hardened state. This necessitates working with the stators to remove the wires while the stators and the insulation are hot. If it becomes too cold, second and third treatments are necessary. Also, trichlorethylene and the other regularly used chemicals may not be effective on some types of insulation utilized on the windings.

Other techniques of conditioning the windings for removal have included the use of conventional ovens into which the stators are placed. While this is rather effective for heating and conditioning the stator windings, this is a rather inefficient way to condition the windings, since the ovens must heat the entire motor stator and not just the windings or the area of the stator where the windings are located. Also, this does not solve the problem of combustible products being given off and polluting the air.

SUMMARY OF THE INVENTION

According to the present invention, a motor stator heating furnace and method of heating motor stators for conditioning the windings for removal is provided. The furnace includes an annular centrally located radiantly heated tube which extends upwardly from a base. The base is provided with support means to support motor stators in stacked relationship over the radiant tube so that the tube may be heated to concentrate the necessary heat centrally within the motor stators for charring and burning the insulation of the winding wires on the motor stators. The invention also preferably includes an afterburner disposed in an afterburner chamber through which the emitted matter from the motor windings must pass, and also through which the products of the combustion from the radiant tube pass and in which chamber the flame from the afterburner provides complete combustion of these products. Thus, the emissions have either minimal amounts of or are actually free of air pollutants. This allows an efficient method for treating insulation on the winding wires for removal of the wires without contributing to the pollution of the atmosphere.

DESCRIPTION OF THE DRAWINGS

FIG. 1 is a perspective view somewhat diagrammatic showing the structural components of a stator heating furnace according to this invention in the open position;

FIG. 2 shows the device of FIG. 1 in a closed position;

FIG. 4 is a partial longitudinal sectional view showing the structure and mounting of a radiant tube of smaller diameter in its operative region;

FIG. 5 is a partial longitudinal sectional view showing the structure and mounting of a radiant tube of larger diameter in its operative region; and FIG. 6 is a longitudinal sectional view of another embodiment of a furnace according to this invention.

DESCRIPTION OF THE PREFERRED EMBODIMENTS

Figure 3:
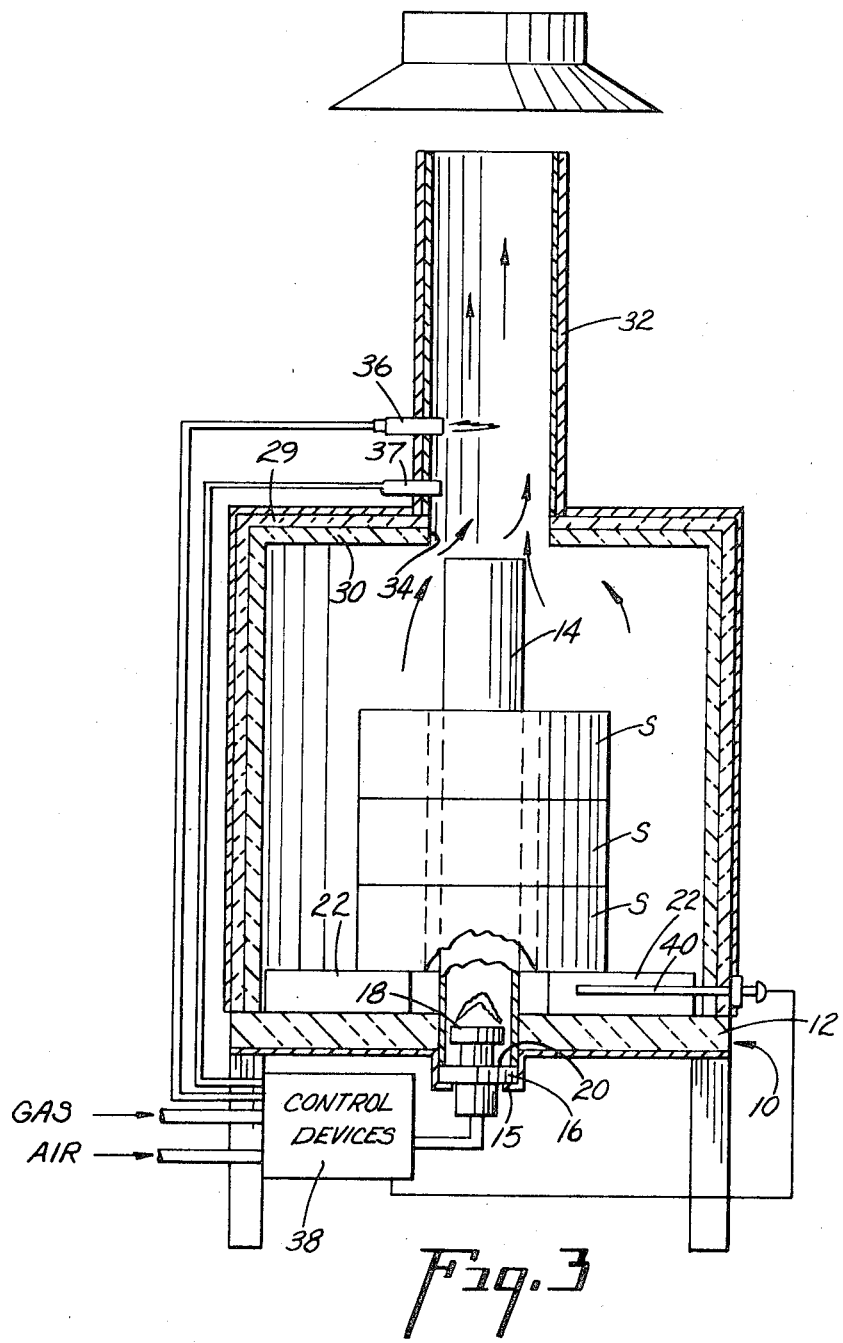
FIG. 3 is a longitudinal sectional view somewhat diagrammatic showing the heating furnace according to this invention.

Referring now to the drawings, a motor stator heating furnace according to this invention is shown. In the illustrated embodiment, the furnace includes a base member designated generally as 10, having a layer of thermal insulation 12 disposed thereon. The base member 10 and insulation 12 have a central opening unnumbered disposed to receive the base of a radiant tube 14. As can best be seen in FIG. 3, the base member 10 is formed with a depending flange 15 which mounts a support member 16. The support member 16 supports centrally thereof a burner 18. The support member 16 also supports the lower end of radiant tube 14 on the upper surface 20 thereof. The radiant tube 14 is removably disposed within the central opening and rests on the support surface 20 so that tubes can be replaced for a purpose which will appear presently.

Disposed on top of the insulation 12 are four circumferentially spaced stator support rails 22. These rails 22 are disposed to support, in stacked relationship, motor stators designated generally as S, as can best be seen in FIG. 3. These stators in their stacked relationship surround the radiant tube 14, and the number which can be stacked depends upon the thickness of the stators.

The furnace also includes a pair of clamshell-type cover sections 24 and 26 which are pivotally mounted on a vertically extending pivot post 28. The cover sections 24 and 26 are each provided with thermal insulation internally thereof. Preferably, the insulation takes the form of two distinct layers of insulation. The outer layer of insulation designated as 29 is a relatively high-density low-thermal conductivity insulation, while the inner layer 30 is relatively low-density high-conductive-type insulation. With this type of insulation, the furnace will retain its heat while it is on the heating cycle, but will cool rapidly after the heating cycle is completed and stators are being cooled.

Disposed on the top of the cover section 26 is a cylindrical afterburner chamber 32. The afterburner chamber 32 is in communication with the interior of the furnace through opening 34 when the covers are closed and the furnace is in position for operation. The afterburner chamber 32 is provided with an afterburner 36 disposed to burn within the chamber 32 as shown in FIG. 3. Also, an air line 37 is provided to the afterburner chamber 32 to supply oxygen for oxidizing the combustibles passing through the afterburner chamber 32. This will assure a sufficient oxygen supply for complete combustion with the air supplied at a location where it will mix with the combustibles before they pass the burner 36.

Air and gas are supplied to the burners 18 and 36 and the air line 37 from external sources as shown diagrammatically in FIG. 3. The air and gas is supplied through appropriate control devices which are designated generally by the rectangle 38. These control devices are conventional equipment and do not per se form any part of this invention. This may include such devices as pressure regulators, safety valves, etc. The control devices also may include some type of control for the burner 18 to regulate the interior temperature of the furnace. When such automatic temperature regulation is used, a thermocouple shown at 40 is provided at some point within the furnace where the temperature is to be measured. The thermocouple is connected in a conventional manner to the control devices to regulate the burning of the fuel by burner 18 in a well-known manner to provide the desired internal temperature.

In operation, the furnace is first opened to the position shown in FIG. 1, and the stators to be heated are stacked over the tube 14, with the bottom one resting on the support rails 22. The stators are stacked to such a height that they do not extend above the top of the radiant tube 14. The cover sections 24 and 26 are then closed and latched, and the heating of the furnace is commenced by firing the burner 18 to heat the radiant tube 14. The burner 18 heats the radiant tube 14 which in turn radiates the heat therefrom to the internal portions of the annular motor stators. These internal portions are where the grooves are located in which are disposed the coils of insulated wire which are to be treated for removal. Thus, the heating of the stators is concentrated to that area where the coils are disposed for charring and removing the insulation.

As the insulation is heated up, the insulation chars and part of it is volatilized and part becomes light specks, and this volatile matter and the light specks pass upwardly from the interior of the furnace to the afterburner chamber 32. Also, passing into the afterburner chamber 32 are the products of combustion from the end of the radiant tube 14. As all of these products pass through the afterburner chamber 32, the afterburner 36 is burning with excess oxygen so that the volatile products of combustion and the volatile combustible matter from the stators is completely burned. Thus, the material passing from the afterburner contains only the products of complete combustion, and because of the composition of the insulation on the wire, these products provide only minimal or, in some cases, no pollution to the atmosphere.

It is preferable that, as shown in FIG. 3, the end of the radiant tube 14 and the size and location of the opening 34 to the afterburner chamber are so selected and positioned to provide a somewhat restricted opening to the afterburner chamber to thus provide an orifice effect, thereby enhancing or increasing the gas flow from the interior of the furnace into the afterburner chamber 32. This flow pattern from the interior of the furnace to the afterburner chamber 32 is shown by arrows in FIG. 3. After the insulation has been charred, the stators are cooled and the wiring removed. To enhance the cooling rate, air may be blown through the radiant tube 14 after burning has been completed. This can be done through the burner 18 utilizing its connection to the source of air.

As was indicated previously, the radiant tube 14 is removably supported on the support surface 20 of the support member 16. This allows for facile removal and replacement of the radiant tube 14. Such removal and replacement serves several purposes. First, a damaged or worn out tube may be easily replaced without necessitating expensive down time and expensive mechanical operations to dismantle the furnace. Further, such a structure allows the use of different size of radiant tubes 14 in a single furnace construction. The tube shown in FIGS. 1 through 3 is a cylindrical tube essentially of constant diameter throughout its entire length. Other tubes of larger or smaller diameters in their operative areas may also be employed. This is shown schematically in FIGS. 4 and 5. In FIG. 4 a tube 14a of a reduced diameter in the operative region is shown, in which case the lower portion 42a of the tube has the same diameter as the diameter of the tubes shown in FIGS. 1 through 3, with the upper portion 44a which extends into the enclosure of the furnace having a reduced diameter. This allows the furnace to receive stators of smaller diameter.

In FIG. 5 the mounting of a radiant tube 14b is shown wherein the upper portion 44b of the tube 14b has an enlarged diameter from that of the lower portion 42b which extends through the opening and rests on the support member 16. This larger diameter allows a more efficient heating of stators with larger internal diameters.

Referring now to FIG. 6, a furnace having a base 100 is provided which has an annular sand seal 102. A cover member is provided in the form of a generally cylindrical bell member 104 which has a lower heating chamber 106 and an upper afterburner chamber 108. The lower edge 110 of the member 104 is disposed for sealing engagement with the sand 102. Lifting rings 112 are provided for removing and replacing the bell member 104, and provide access for loading and unloading. As in the previous embodiment, a burner 114 is provided in the base as well as a radiant tube 116. Also, an afterburner 118 is provided in the afterburner chamber.

This embodiment operates essentially the same as the previous embodiment but provides a more airtight enclosure. A tight enclosure may often be desirable to prevent open flame from occurring within the main heating chamber. Certain types of insulation may tend to burn rapidly and burst into open flames more readily than others. In some cases, the uncontrolled temperature caused by the open flame may not be desirable, and this construction which limits the flow of oxygen which can thus prevent open flame and thence allow proper temperature control. For even greater control, air could be supplied by piping and control valve (not shown) to the chamber 106.

In the above-described embodiments the apparatus in each case employed but a single radiant tube. It is to be understood, however, that a plurality of radiant tubes and associated burners and stator supports could be employed in a single apparatus to increase the capacity thereof.

Thus, a single furnace can accommodate radiant tubes of different diameters, which tubes can be facilely inserted and replaced to thereby allow efficient accommodation of motor stators of many different sizes.

We claim:
1. Apparatus for heating annular workpieces comprising;
   support means disposed to support the workpieces,
   radiant heating tube means disposed to extend internally of said workpieces,
   enclosure means disposed to provide enclosure during operation and access to the tube and support means for loading and unloading, and
   means to heat said radiant tube means.
2. The device of claim 1 further characterized by enclosure means disposed to provide enclosure during operation and access to the tube and support means for loading and unloading.
3. The device of claim 2 wherein said enclosure means includes an afterburner chamber, and burner means disposed in said chamber to cause combustion of said products.
4. The device of claim 3 further characterized by said afterburner chamber being disposed in alignment with said radiant tube.
5. The device of claim 4 further characterized by said afterburner chamber having a reduced area entry thereto from the remainder of the enclosure, and said entry being positioned and configured to define in conjunction with the end of said radiant tube an orifice.
6. The invention as defined in claim 1 further characterized by sealing means sealing the enclosure from the surrounding atmosphere.
7. The invention as defined in claim 1 wherein said enclosure means is defined by mating swingable members.
8. The device of claim 1 further characterized by base means mounting said radiant tube.
9. The device of claim 8 wherein said tube and said base means are configured to removably support said tube, whereby tubes having different size operative regions may be employed.
10. The device of claim 1 further characterized by means to control the heating of said tube.

11. A method of treating motor stators to loosen the coils for removal thereof comprising the steps of,
  providing a radiant tube,
  placing at least one of said stators over said tube in surrounding relationship therewith,
  said tube extending through said stator, enclosing said tube and surrounding stator,
  and heating said radiant tube,
  whereby the insulation on the wires of the coils is sufficiently destroyed to allow removal of the wires from the stator.

12. The method of claim 11 further characterized by collecting the volatile products in an afterburner chamber, and burning the products in said chamber.

13. The method of claim 11 further characterized by stacking a plurality of motor stators in superimposed relationship surrounding said tube.

14. The method of claim 11 further characterized by controlling the heating of said tube to provide a selected temperature at said stators.

15. The method of claim 12 further characterized by heating said radiant tube with hydrocarbon fuel, and then passing the products of combustion of the fuel to the afterburner chamber.

16. The invention as defined in claim 11 further characterized by passing cooling fluid through said tube after the heating thereof, whereby to increase the cooling rate of the stators.

17. The invention as defined in claim 3 further characterized by means to supply air to the afterburner chamber.

* * * * *